(No Model.)

W. READ, Jr.
DEVICE FOR HOLDING SENSITIZED PAPER IN CONTACT WITH NEGATIVES.

No. 425,958. Patented Apr. 15, 1890.

WITNESSES
L. E. Brown.
A. D. Hanson.

INVENTOR
Wm Read Jr

UNITED STATES PATENT OFFICE.

WILLIAM READ, JR., OF BOSTON, MASSACHUSETTS, ASSIGNOR TO PHILIP H. GOSS, OF SAME PLACE.

DEVICE FOR HOLDING SENSITIZED PAPER IN CONTACT WITH NEGATIVES.

SPECIFICATION forming part of Letters Patent No. 425,958, dated April 15, 1890.

Application filed May 29, 1889. Serial No. 312,632. (No model.)

*To all whom it may concern:*

Be it known that I, WILLIAM READ, Jr., of Boston, in the county of Suffolk and State of Massachusetts, have invented certain new and useful Improvements in Devices for Holding Sensitized Paper in Contact with Negatives, of which the following is a specification.

This invention has for its object to provide a simple and inexpensive device whereby a piece of sensitized paper may be held in close contact with a negative during exposure to light for the purpose of printing on said paper; and it consists in a plate or bed, preferably of sheet metal, having at opposite edges two flexible ears or flanges projecting over the portions of the plate and two wedges or rods adapted to be inserted under said flanges, and to be pressed thereby on a negative supported by said plate, the flanges constituting spring-holders, which press said rod against the negative and hold the latter in close contact with a piece of sensitized paper interposed between it and the plate.

Figure 1:
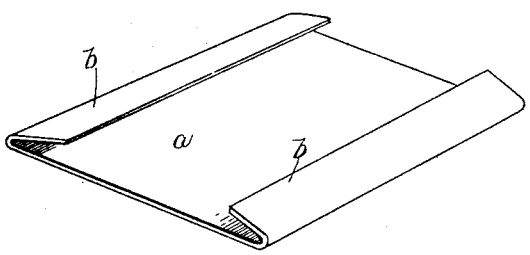
Figure 2:

Of the accompanying drawings, forming a part of this specification, Figure 1 represents a perspective view of the flanged plate. Fig. 2 represents a transverse section of the same with the negative and sensitized paper in place.

The same letters of reference indicate the same parts in both figures.

In the drawings, $a$ represents a plate of sheet metal, having two of its edges bent over to form ears or flanges $b\ b$, projecting over portions of the plate. Said ears are sufficiently elastic to serve as springs, so that when the rods or wedges $c\ c$ are inserted under them, as shown in Fig. 2, they will exert a downward pressure on said rods and through the latter on a negative $d$ between said rods and the plate, and hold said negative in close contact with a piece $e$ of sensitized paper interposed between the negative and the plate.

In using this device the sensitized paper is laid on the plate between the flanges $b\ b$ and the negative, which may be on gelatine, glass, mica, or any suitable transparent or translucent material, is placed on the paper. The rods or wedges are then forced inwardly under the flanges, as shown in Fig. 2. After exposure the rods are removed and the print on the sensitized paper is developed as usual.

The device is intended chiefly as a toy photographic-printing outfit, and may be supplied at a very slight expense with a block of sensitized-paper sheets. The negative employed may be an ordinary photographic negative on glass or a sheet of gelatine or other transparent or translucent material on which a picture or design is printed.

It will be seen that by the employment of a photographic portrait negative the original thereof by the use of the above-described apparatus can cheaply and expeditiously print copies of the portrait.

I claim—

As a holder for sensitized paper and a negative placed thereon, a bed or plate having flexible ears or flanges projecting over portions of the surface of the bed and wedges or rods adapted to be inserted under said flanges, as set forth.

In testimony whereof I have signed my name to this specification, in the presence of two subscribing witnesses, this 18th day of May, A. D. 1889.

WILLIAM READ, JR.

Witnesses:
C. F. BROWN,
A. D. HARRISON.